United States Patent
Wu et al.

(10) Patent No.: US 11,621,572 B2
(45) Date of Patent: Apr. 4, 2023

(54) METHOD OF OPERATING AN ELECTRIC POWER SYSTEM, ELECTRIC POWER SYSTEM, AND COMPUTER EXECUTABLE CODE

(71) Applicant: GRABTAXI HOLDINGS PTE. LTD., Singapore (SG)

(72) Inventors: Xihu Wu, Beijing (CN); Lei Jiang, Beijing (CN); Pengfei Yu, Beijing (CN); Yi Zheng, Kirkland, WA (US); He Zhang, Beijing (CN)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/636,850

(22) PCT Filed: Apr. 2, 2020

(86) PCT No.: PCT/SG2020/050205
§ 371 (c)(1),
(2) Date: Feb. 18, 2022

(87) PCT Pub. No.: WO2021/201768
PCT Pub. Date: Oct. 7, 2021

(65) Prior Publication Data
US 2023/0039954 A1    Feb. 9, 2023

(51) Int. Cl.
*H02J 7/00* (2006.01)
*B60L 58/13* (2019.01)
(Continued)

(52) U.S. Cl.
CPC .......... *H02J 7/0047* (2013.01); *B60L 3/0046* (2013.01); *B60L 58/13* (2019.02);
(Continued)

(58) Field of Classification Search
CPC ...... H02J 7/0047; B60L 58/13; B60L 3/0046; B60L 2240/545; H01M 2010/4271; H01M 2220/20
(Continued)

(56) References Cited

U.S. PATENT DOCUMENTS

| | | | |
|---|---|---|---|
| 2013/0113436 A1 | 5/2013 | Ishibashi | |
| 2014/0091751 A1* | 4/2014 | Workman | H02J 7/0016 320/126 |

(Continued)

FOREIGN PATENT DOCUMENTS

| | | |
|---|---|---|
| CN | 101867062 | 10/2010 |
| CN | 104106175 | 10/2014 |

(Continued)

OTHER PUBLICATIONS

Chinese Office Action (Application No. 202080052611.4) dated Aug. 31, 2022 (8pages).

(Continued)

*Primary Examiner* — Nathaniel R Pelton
(74) *Attorney, Agent, or Firm* — Nixon Peabody LLP; Jeffrey L. Costellia (57) ABSTRACT

A method of operating an electric power system, which may include: determining a charge state of a first battery unit and a charge state of a second battery unit; determining a difference between the charge state of the first battery unit and the charge state of the second battery unit; and determining whether to enable discharging simultaneously of both the first battery unit and the second battery unit, or to enable discharging of one of the first and second battery units, based on the difference between the charge state of the first battery unit and the charge state of the second battery unit. At least one of the first and second battery units may be a swappable battery unit. The disclosure further relates to an (Continued)

electric power system and to a computer executable code including instructions for operating an electric power system.

20 Claims, 5 Drawing Sheets

(51) Int. Cl.
*B60L 3/00* (2019.01)
*H01M 10/42* (2006.01)

(52) U.S. Cl.
CPC .................. *B60L 2240/545* (2013.01); *H01M 2010/4271* (2013.01); *H01M 2220/20* (2013.01)

(58) Field of Classification Search
USPC .......................................................... 320/127
See application file for complete search history.

(56) References Cited

U.S. PATENT DOCUMENTS

| | | | | |
|---|---|---|---|---|
| 2017/0163060 A1* | 6/2017 | Zheng | .................. | H02J 7/0019 |
| 2018/0109133 A1* | 4/2018 | Wei | ........................... | H02J 7/34 |

FOREIGN PATENT DOCUMENTS

| | | |
|---|---|---|
| CN | 106451623 | 2/2017 |
| CN | 107251363 | 10/2017 |
| CN | 108128166 | 6/2018 |
| CN | 110392956 | 10/2019 |
| WO | WO-2013/127099 | 9/2013 |

OTHER PUBLICATIONS

International Preliminary Report on Patentability for Application No. PCT/SG2020/050205, dated Jan. 3, 2022 (4 pp).

* cited by examiner

METHOD OF OPERATING AN ELECTRIC POWER SYSTEM, ELECTRIC POWER SYSTEM, AND COMPUTER EXECUTABLE CODE

TECHNICAL FIELD

An aspect of the disclosure relates to a method of operating an electric power system. Another aspect of the disclosure relates to an electric power system. Yet another aspect of the disclosure relates to a computer executable code including instructions carrying out the method and/or for operating the electric power system.

BACKGROUND

Vehicles, such as electric scooters, have a battery unit which needs to be charged. Once out of power, the vehicles need to be parked and a relatively long time is required until the battery unit is recharged. Other vehicles may have swappable batteries, for example two swappable battery units, however there is no individual control of the charge states of the swappable battery units, which leads to disadvantages. For example, in the case that the system is not powered off, only one battery is swapped and there is a relatively large voltage difference between the two battery units on the vehicle, the battery units may be damaged and fire may break out. Therefore, there is a need to provide for improved methods and electric power systems.

SUMMARY

An aspect of the disclosure relates to a method of operating an electric power system. The method may include determining a charge state of a first battery unit and a charge state of a second battery unit. The method may further include determining a difference between the charge state of the first battery unit and the charge state of the second battery unit. The method may further include determining whether to enable discharging simultaneously of both the first battery unit and the second battery unit, or to enable discharging of one of the first battery unit and the second battery unit, based on the difference between the charge state of the first battery unit and the charge state of the second battery unit. At least one of the first and second battery units, for example each of the first and second battery units, may be a swappable battery unit.

Another aspect of the disclosure relates to an electric power system. The electric power system may include a first electrical connection for connecting with a first battery unit. The electric power system may further include a second electrical connection for connecting with a second battery unit. The electric power system may further include a power control circuit including a microprocessor in communication with the first battery unit and the second battery unit when these are connected. The processor may be configured to determine a charge state of the first battery unit and a charge state of the second battery unit. The processor may be further configured to determine a difference between the charge state of the first battery unit and the charge state of the second battery unit. The processor may be further configured to determine whether to enable discharging simultaneously of both the first battery unit and the second battery unit, or to enable discharging of one of the first and second battery units, based on the difference between the charge state of the first battery unit and the charge state of the second battery unit. At least one of the first and second battery units, for example each of the first and the second battery units, may be a swappable battery unit. The electric power system may include the first and the second battery units.

Another aspect of the disclosure relates to an electric vehicle comprising an electric power system according to various embodiments. The electric vehicle may be an electric scooter.

Another aspect of the disclosure relates to a computer executable code including instructions for carrying out the method according to various embodiments related to methods and/or for operating the electric power system according to various embodiments related to electric power systems. The computer executable code may be included in a computer program product, for example, including a memory.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the methods, systems, or computer programs (or computer program products) are analogously valid for the other methods, systems, or computer programs (or computer program products). For example, embodiments described in the context of a method are analogously valid for a system, and vice-versa.

Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, and in accordance with various embodiments, the term "and/or" includes any and all combinations of one or more of the associated listed items.

As used herein, and in accordance with various embodiments, the term "step" when used in the context of a method may mean a sub-method which may include one or more sub-steps.

As used herein, and in accordance with various embodiments, the terms "first" and "second", when preceding "pre-determined charge difference" and "comparison result", are used for distinguishing the different elements, and may have no other function, for example, in some embodiments, there may be a "second comparison result" without a "first comparison result".

As used herein, and in accordance with various embodiments, the term "discharge", as used herein, may mean supply, for example, in a "discharge mode", a battery supplies power to a load (e.g., a circuit and/or a motor). The discharge mode may also be named herein as supply mode. Similarly, a discharge enable or disable command may also be respectively named as supply enable or disable command.

As used herein, and in accordance with various embodiments, the expression "charge state" may refer to a voltage, for example a voltage of a battery may be indicative and/or proportional to a charge state of a battery. Other methods for determining charge state, than measuring a voltage, may also be implemented. Differences of charge state may be in absolute value.

As used herein, and in accordance with various embodiments, one of the first and second batteries may mean only one, for example, the first battery to the exclusion of the second battery, or the second battery to the exclusion of the first battery.

As used herein and in accordance with various embodiments, it is understood that communication between the power control circuit and at least one of the first and second battery units (and equivalent expressions), may mean communication between the microprocessor and the at least one of the first and second battery units. A communication with a battery unit may mean a communication via a battery management system (BMS) or with the BMS of that battery unit in the case that the battery unit has an integrated BMS. According to various embodiments, each of the first and second battery units may include a respective BMS.

As each of the first and second battery units may be swappable, and in some embodiments, each of the first and second battery units is swappable, the expression "each of the first and second battery units" as used herein, may mean, each of the first and second battery units as far as present.

According to various embodiments, each of the first and second battery units may be configured such that when the battery unit is connected to the electric power system the respective small current output is turned on. Each of the first and second battery units may include a hardware detection circuit, for example, as part of the BMS. The hardware detection circuit may be configured to detect whether connection with the power control circuit is established. Upon the detection that the connection with the power control circuit is established, the battery unit of the respective hardware detection circuit, turns on the small current circuit. A connection may be detected, for example, via electrical coupling.

According to various embodiments, each of the first and second battery units may be configured to detect whether connection with the power control circuit is established. Each of the first and second battery units may be configured to turn off its small current output when a pre-determined time period has lapsed from the detection of the respective connection, and communication with the power control circuit has not been established. Further the respective high current output may also be turned off.

In some embodiments a comparison may be carried out to determine which one of the battery units has a higher charge and which one has a lower charge state. In case that the measured charge states are identical, the higher charge state could be attributed to the first battery unit and the lower charge state could be attributed to the second battery unit.

Figure 1:
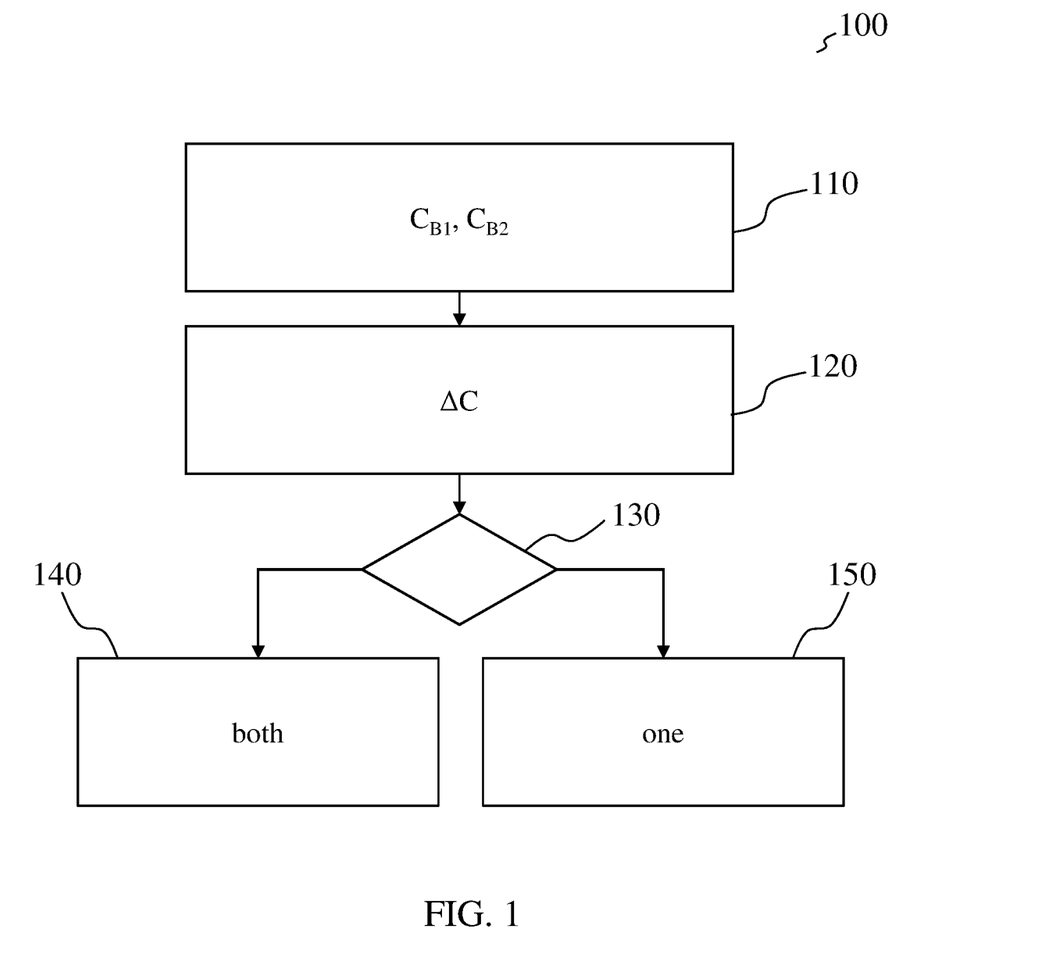
FIG. 1 shows a flowchart of a method 100 in accordance with various embodiments.

FIG. 1 shows a flowchart of a method 100 of operating an electric power system in accordance with various embodiments. The electric power system may include a first battery unit which may be swappable, and may further include a second battery unit which may be swappable. Preferably each of the first and second battery units are swappable.

As used herein, and in accordance with various embodiments, the expression "battery unit" may refer and also be known as a battery pack. Thus, the first battery unit may also be referred to as the first battery pack and the second battery unit may be referred to as the second battery pack. A battery unit may include an accumulator for storing electric charge. A battery unit may include a connection, for example including terminals to supply power, for example small current terminals or high current terminals, which may be the same terminals or separate terminals. A battery unit may also include a BMS. The BMS may be configured to communicate via a communication interface, for example to receive at least one of the commands to: enable discharging, disable discharging, enable charging, disable charging. Charge enabling and/or disabling may also be automatic, wherein the battery charges once a sufficient power (e.g., a sufficient voltage while having sufficient current capacity) is applied at the respective battery terminals used for charging. Enable discharging may include enabling a high current output of the respective battery unit. Disable discharging may include disabling a high current output of the respective battery unit, and may further include disabling the small current output of the respective battery unit.

The method 100 may include a step 110 of determining a charge state of a first battery unit and a charge state of a second battery unit, for example, a first charge state $C_{B1}$ of the first battery unit and a second charge state $C_{B2}$ of the second battery unit. For example each of the charge states may be determined as a voltage.

The method 100 may further include a step 120 of determining a difference between the charge state of the first battery unit and the charge state of the second battery unit. For example a difference $\Delta C=|C_{B1}-C_{B2}|$ may be calculated. In a decision step 130 it may be determined whether to proceed to step 140 to enable discharging simultaneously of both the first battery unit and the second battery unit, or to proceed to step 150 to enable discharging of one of the first and second battery units. The determination is based on the difference between the charge state of the first battery unit and the charge state of the second battery unit. The flowchart of FIG. 1 shows one possible implementation of the disclosure, however the skilled person in the art would understand that variations thereof are possible. For example, calculations and comparisons may be implemented differently than shown. The order of the method steps is shown by the arrows for illustrating one possible order, however the disclosure is not limited thereto and the method steps may also be carried out in a different order than shown.

As used herein, and in accordance with various embodiments, the expression "simultaneously" may refer to at the same time, or consecutively within a very short time span, for example, of less than 200 milliseconds, preferably less than 80 milliseconds. The method as explained in connection with FIG. 1 may be used to decide whether to switch to a dual-battery supply mode or to a single battery supply mode, for example from a standby mode or another suitable mode, as will be explained in more details in connection with FIG. 7.

Figure 2:
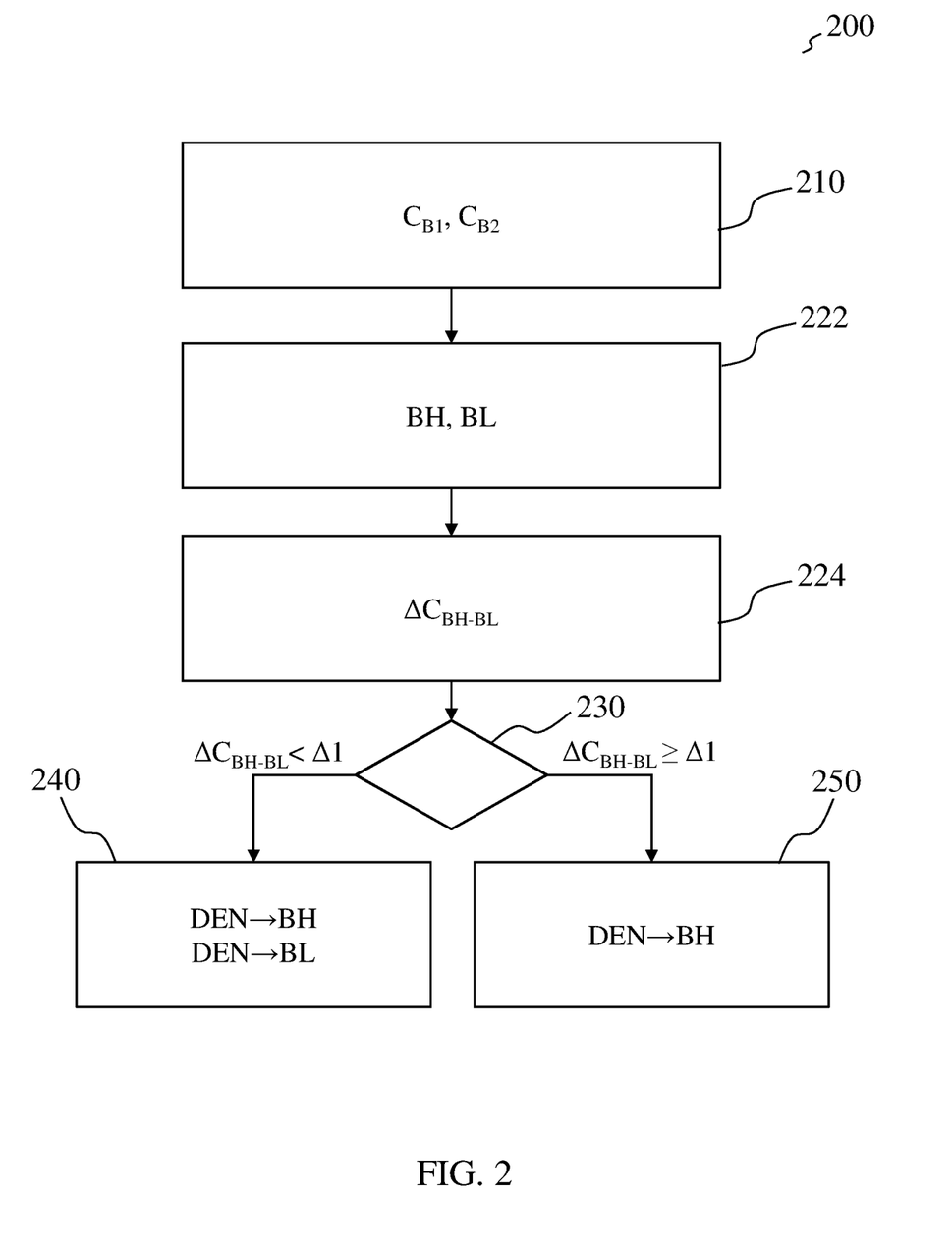
FIG. 2 shows a flowchart of a method 200 in accordance with various embodiments.

FIG. 2 shows a flowchart of a method 200 of operating an electric power system in accordance with various embodiments. Some of the elements and method steps may be already explained in connection with FIG. 1 and their explanation may be omitted here for simplicity.

The method 200 may include a step 210 of determining a charge state of a first battery unit and a charge state of a second battery unit, for example, a first charge state $C_{B1}$ of the first battery unit and a second charge state $C_{B2}$ of the second battery unit. The method 200 may further including a step 222 of determining a lower charge state and a higher charge state among the first battery unit and the second battery unit. For example, step 222 and/or step 224 may be carried out as part of a same determining step, for example in the step 120 of determining the difference of FIG. 1. In step 222, it may be determined which battery unit (BH) has the highest charge $C_{BH}$ and which battery unit (BL) has the lowest charge $C_{BL}$ amongst the first battery unit B1 and the second battery unit B2.

The method 200 may include a step 224 wherein a difference between the charge state of the first battery unit and the charge state of the second battery unit may be calculated. For example a difference $\Delta C_{BH-BL} = C_{BH} - C_{BL}$ may be calculated, this difference may also be calculated by other formulas, for example $|C_{B1} - C_{B2}|$. In a decision step 230, it may be carried out a comparison of the difference between the higher charge state and the lower charge state $\Delta C_{BH-BL}$ with a first pre-determined charge difference $\Delta 1$ to obtain a first comparison result. Further, it may be determined whether to enable discharging simultaneously of both the first battery unit and the second battery unit, or to enable discharging of one of the first and second battery units, based on the first comparison result. For example, the method 200, may include (for example as step 240) enabling discharging simultaneously of both the first battery unit and the second battery unit (DEN→BH, DEN→BL), when the first comparison result indicates that the difference between the higher charge state and the lower charge state is lower than the first pre-determined charge difference, for example, when $\Delta C_{BH-BL} < \Delta 1$ is satisfied.

According to various embodiments, the first pre-determined charge difference $\Delta 1$ may be chosen in Volts from 500 mV to 1500 mV, for example from 800 mV to 1200 mV, for example the first pre-determined charge difference $\Delta 1$ may be 1000 mV.

The method 200 may further include (for example as step 250) enabling discharging of the one (BH) of the first and second battery units with the higher charge state $C_{BH}$, and may optionally include disabling discharging of the battery unit (BL) of the first and second battery units with the lower charge state $C_{BL}$, when the first comparison result indicates that the difference between the higher charge state and the lower charge state is higher than (or higher than or equal to) the first pre-determined charge difference, for example, when $\Delta C_{BH-BL} \geq \Delta 1$ is satisfied.

The flowchart of FIG. 2 shows one possible implementation of the disclosure, however the skilled person in the art would understand that variations thereof are possible. For example, calculations and comparisons may be implemented differently than shown. In one example, step 224 may be integrated into step 230 by providing the comparison between the higher charge state $C_{BH}$ and a sum of the lower charge state with the first pre-determined charge difference $C_{BL} + \Delta 1$ or other equivalent forms of these comparisons which is another form of determining the difference. The order of the method steps is shown by the arrows for illustrating one possible order, however the disclosure is not limited thereto and the method steps may also be carried out in a different order than shown.

The method as explained in connection with FIG. 2 may be used to decide whether to switch to a dual-battery supply mode or to a single battery supply mode, for example from a standby mode or another suitable mode, as will be explained in more details in connection with FIG. 7.

Figure 3:
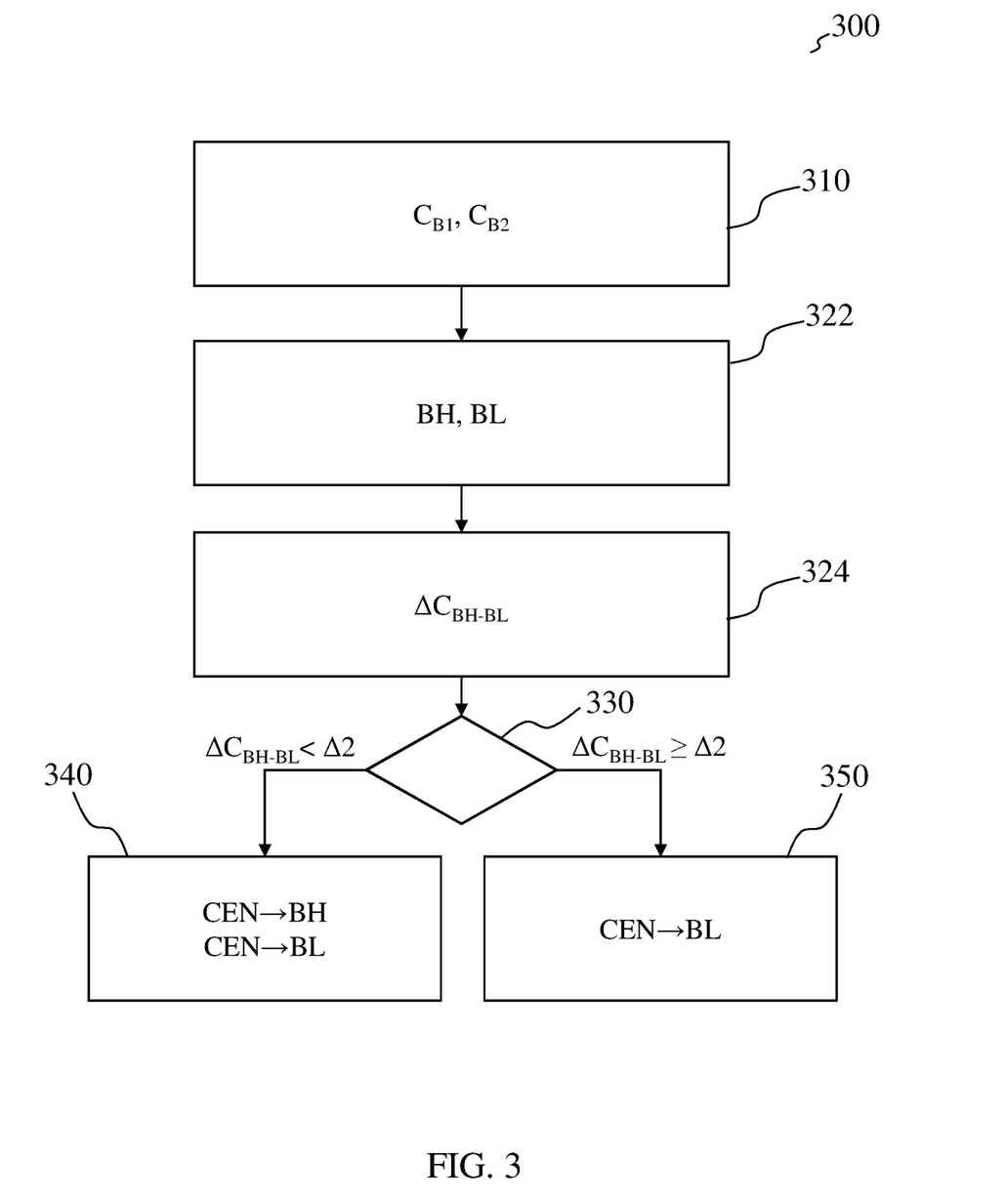
FIG. 3 shows a flowchart of a method 300 in accordance with various embodiments.

FIG. 3 shows a flowchart of a method 300 of operating an electric power system in accordance with various embodiments. The method 300 may be combined with method 200 of FIG. 2, as an alternative branch, wherein method 200 is for discharging and method 300 is for charging. Both methods 200 and 300 may share method steps in common, for example, obtaining charge state of the battery units, providing comparison, and/or providing differences may be implemented by a same function. Thus, some of the elements and method steps may be already explained in connection with FIG. 1 and FIG. 2 and their explanation may be omitted here for simplicity.

According to various embodiments, the method 300 may include steps 310, 322, 324 which may be identical to steps 210, 222, 224 respectively as explained in connection with FIG. 2.

The method 300 may include a step 310 of determining a charge state of a first battery unit and a charge state of a second battery unit, for example, a first charge state $C_{B1}$ of the first battery unit and a second charge state $C_{B2}$ of the second battery unit. The method 300 may further include a step 322 of determining a lower charge state and a higher charge state among the first battery unit and the second battery unit. For example, step 322 and/or step 324 may be carried out as part of a determining step, for example in the step 120 of determining the difference of FIG. 1. In step 322, it may be determined which battery unit (BH) has the highest charge $C_{BH}$ and which battery unit (BL) has the lowest charge $C_{BL}$ amongst the first battery unit B1 and the second battery unit B2.

The method 300 may further include a step 324 wherein a difference between the charge state of the first battery unit and the charge state of the second battery unit may be calculated. For example a difference $\Delta C_{BH-BL} = C_{BH} - C_{BL}$ may be calculated, this difference may also be calculated by other formulas, for example $|C_{B1} - C_{B2}|$. In a decision step 330 it may be carried out a comparison of the difference between the higher charge state and the lower charge state $\Delta C_{BH-BL}$ with a second pre-determined charge difference $\Delta 2$ to obtain a second comparison result. According to various embodiments, the method 300 may include determining whether to enable charging of both the first battery unit and the second battery unit, or enable charging of one of the first and second battery units, based on the second comparison result. For example, the method 300, may include (for example as step 340) enabling charging simultaneously of both the first battery unit and the second battery unit (CEN→BH, CEN→BL), when the first comparison result indicates that the difference between the higher charge state and the lower charge state is lower than the second pre-determined charge difference, for example, when $\Delta C_{BH-BL} < \Delta 2$ is satisfied.

The method 300 may further include (for example as step 350) enabling charging of the one (BL) of the first and second battery units with the higher charge state $C_{BL}$, and may optionally include disabling charging of the battery unit (BH) of the first and second battery units with the higher charge state $C_{BH}$, when the first comparison result indicates that the difference between the higher charge state and the lower charge state is higher than (or higher than or equal to) the second pre-determined charge difference, for example, when $\Delta C_{BH-BL} \geq \Delta 2$ is satisfied.

According to various embodiments, the second pre-determined charge difference $\Delta 2$ may be chosen in Volts from 500 mV to 1500 mV, for example from 800 mV to 1200 mV, for example 1000 mV.

The method as explained in connection with FIG. 3 may be used in a charging mode, as will be explained in more details in connection with FIG. 7.

The flowchart of FIG. 3 shows one possible implementation of the disclosure, however the skilled person in the art would understand that variations thereof are possible. For example, calculations and comparisons may be implemented differently than shown. The order of the method steps is shown by the way of arrows for illustrating one possible order, however the disclosure is not limited thereto and the method steps may also be carried out in a different order than shown.

Figure 4:
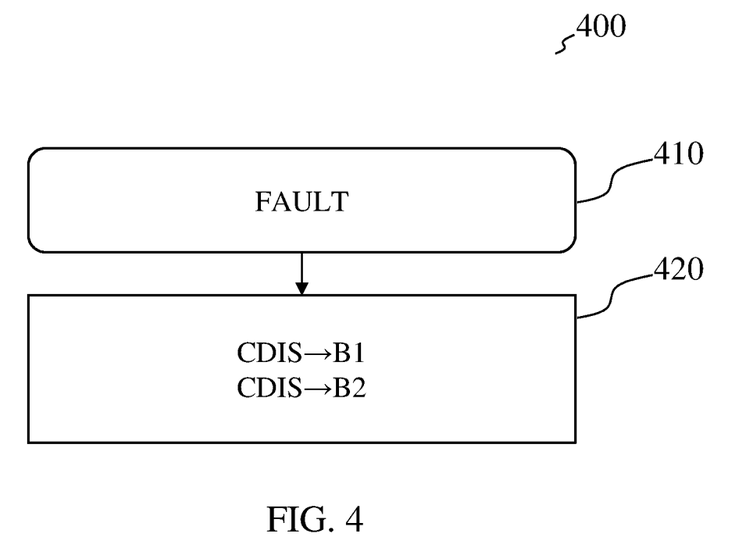
FIG. 4 shows a flowchart of exemplary method steps 400 when a fault is detected, in accordance with various embodiments.

A method according to various embodiments, may further include detecting a fault and entering a fault mode, for which one example implementation will be explained in connection with FIGS. 4 and 5. Fault detection may be implemented at various steps of the method of operating an electric power system and/or may be implemented as a separate process, for example a watch dog circuit may trigger the fault mode when a fault 'FAULT' 410 has occurred. In some embodiments, when a fault of the electric power system is detected, the method may include a step 420 of disabling charging of both the first battery unit and the second battery unit (CDIS→B1, CDIS→B2).

In some embodiments, the detection of a fault may be implemented at any stage of the method, for example, the detection of fault may be implemented in a communication function, which, every time it is called, may check if a communication error has occurred and proceed to fault mode every time in which both the first battery and second battery units are not detected, for example when the communication error have occurred with both of the first battery unit and the second battery units. For example a communication error may occur if data is sent from the power control circuit to one of the first battery and the second battery units and an acknowledgment is not received within a first timeout period.

Figure 5:
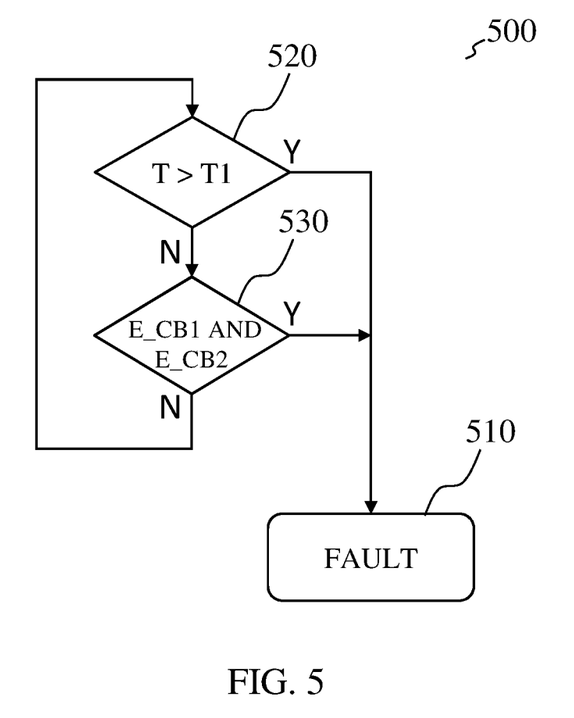
FIG. 5 shows a flowchart of exemplary method steps 500 for detecting fault, in accordance with various embodiments.

FIG. 5 shows an example of a method for detecting a fault, for example a watchdog algorithm, which may be implemented in software and/or hardware for detecting a fault. In the example of FIG. 5, the fault mode 510 is entered when a fault is detected, the fault mode 510 may be the same as 410 of FIG. 4. According to various embodiments, the method may include detecting the fault of the electric power system when: a temperature of the electric power system is above a pre-determined temperature threshold, and/or when failing to detect both the charge state of the first battery unit and the charge state of the second battery unit. In the example of FIG. 5 in a first step 520 a current temperature is compared to a temperature threshold T1, and if the current temperature is higher than T1, the method proceeds to the fault mode 510. If the current temperature is within acceptable limits, for example, lower or equal than T1, then the method proceeds to step 530 which may include the detection of the first and second battery units. When first and second battery units are not detected the method proceeds to the fault mode 510. Otherwise, if at least one battery is detected the method proceeds to step 520 and is repeated. The temperature may be the temperature of the charging circuit, for example the current temperature may be measured at a power transistor of the charging circuit. Also, more than one temperature may be measured from more than one respective sensor, and if at least one temperature of one of the sensors is higher than T1, the method proceeds to the fault mode 510. The flowcharts of FIGS. 4 and 5 show possible implementations of the disclosure, however the skilled person in the art would understand that variations thereof are possible. For example, instead or in addition to a watchdog algorithm, step 530 may be implemented in a communication function, which, every time it is called, may check if a communication error has occurred and proceed to fault mode every time a battery is not detected. The order of the method steps is shown by the arrows for illustrating one possible order, however the disclosure is not limited thereto and the method steps may also be carried out in a different order than shown.

According to various embodiments, the temperature threshold may be chosen from 85° C. to 125° C., for example it may be 90° C.

Figure 6:
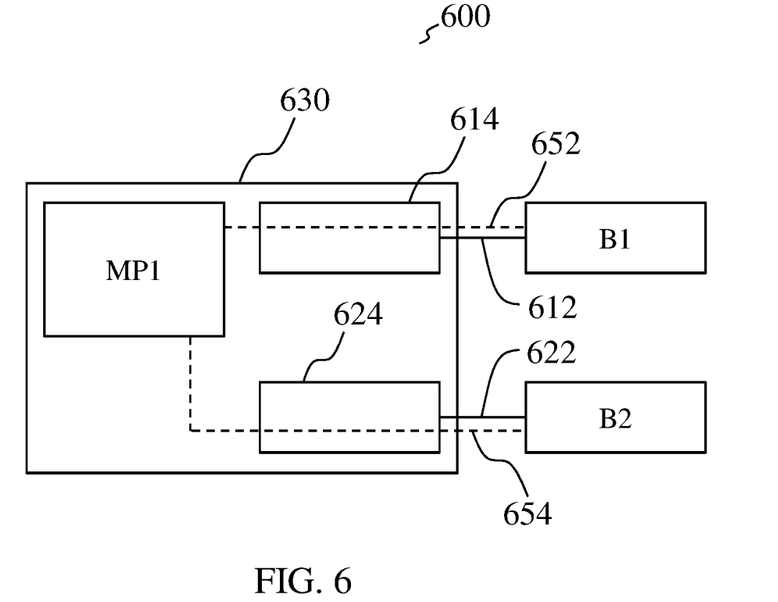
FIG. 6 shows an exemplary electric power system 600 in accordance with various embodiments.

FIG. 6 shows an exemplary electric power system 600 in accordance with various embodiments. The electric power system may be configured to carry out the method as explained in connection with various method embodiments. According to various embodiments, the electric power system 600 may include a first electrical connection 614 for connecting with a first battery unit B1, for example a first connector. A wiring 612 may also be included. The electric power system 600 may include a second electrical connection 624 for connecting with a second battery unit B2, for example a second connector.

The electric power system 600 may further include a power control circuit 630 including a microprocessor MP1 configured to communicate (i.e. send and/or receive data, such as commands) with the first battery unit B1 and the second battery unit B2 when the respective battery unit is connected to one of the first or second electrical connections. The microprocessor MP1 may be configured to determine a charge state of the first battery unit and a charge state of the second battery unit. According to various embodiments the charge state may be determined by measuring voltage of a battery unit, as previously described.

The microprocessor MP1 may be further configured to determine a difference between the charge state of the first battery unit and the charge state of the second battery unit. The microprocessor MP1 may be further configured to determine whether to enable discharging simultaneously of both the first battery unit and the second battery unit, or to enable discharging of one of the first and second battery units, based on the difference between the charge state of the first battery unit and the charge state of the second battery unit. Details of determining the charge state(s) and whether to enable discharging of the first and/or second battery units may be the same as previously explained for the various embodiments relating to methods. Also, at least one of the first and second battery units may be a swappable battery unit, for example, each of the first and second battery units may be a swappable battery unit.

According to various embodiments, enabling discharging may include sending a discharge enable command from a power control circuit of the electric power system to the respective battery unit. For example enabling discharging of the first battery unit may include sending a discharge enable command from the power control circuit of the electric power system to the first battery unit, and enabling discharging of the second battery unit may include sending a discharge enable command from the power control circuit of the electric power system to the second battery unit.

According to various embodiments, disabling discharging may include sending a discharge disable command from the power control circuit to the respective battery unit. For example disabling discharging of the first battery unit may include sending a discharge disable command from the power control circuit of the electric power system to the first battery unit, and disabling discharging of the second battery unit may include sending a discharge disable command from the power control circuit of the electric power system to the second battery unit.

According to various embodiments, enabling charging may include sending a charge enable command from a power control circuit of the electric power system to the respective battery unit. For example, enabling charging of the first battery unit may include sending a charge enable command from the power control circuit of the electric power system to the first battery unit, and enabling charging of the second battery unit may include sending a charge enable command from the power control circuit of the electric power system to the second battery unit.

According to various embodiments, disabling charging may include sending a charge disable command from the power control circuit to the respective battery unit. For example disabling charging of the first battery unit may include sending a charge disable command from the power control circuit of the electric power system to the first battery unit, and disabling charging of the second battery unit may include sending a charge disable command from the power control circuit of the electric power system to the second battery unit.

As used herein, and in accordance with various embodiments, a command, such as charge enable command, charge disable command, discharge enable command, discharge disable command, may be a command sent by the microprocessor of the power control circuit to a battery unit. According to various embodiments, the communication may be via a universal asynchronous receiver-transmitter (UART), for example using RS-232 or RS-485 standard, however the disclosure is not limited thereto and other physical layers and/or communication protocols may be used. Alternatively, the command may be selected from at least one of: a pulse, a pulse edge, a pulse slope, a signal level.

Some embodiments related to method of operating an electric power system, may exclude a method of closing a power switch for discharging an accumulator of a battery unit, wherein the power switch is external (i.e., not integral) to the battery unit. Some embodiments related to method of operating an electric power system, may exclude a method of closing a corresponding power switch of a first and a second power switches for discharging that accumulator of a first and a second accumulators having a higher charge state, the power switch being external (i.e., not integral) to the battery unit. The first accumulator being of the first battery unit and the second accumulator being of the second battery unit.

Some embodiments related to an electric power system, may not have a power switch for switching a discharge current path for discharging an accumulator of a battery unit, wherein the power switch is external (i.e., not integral) to the battery unit. Some embodiments related to an electric power system, may not have a first power switch between a first discharging current path and a third discharging current path, and a second power switch between a second discharging current path and a third discharging current path, the first and second discharging path connecting or connectable to a first accumulator and a second accumulator respectively, the third discharging path connecting or connectable to a load, wherein each of the first and second power switches are external (i.e., not integral) to the battery unit. The first accumulator being of the first battery unit and the second accumulator being of the second battery unit.

Figure 7:
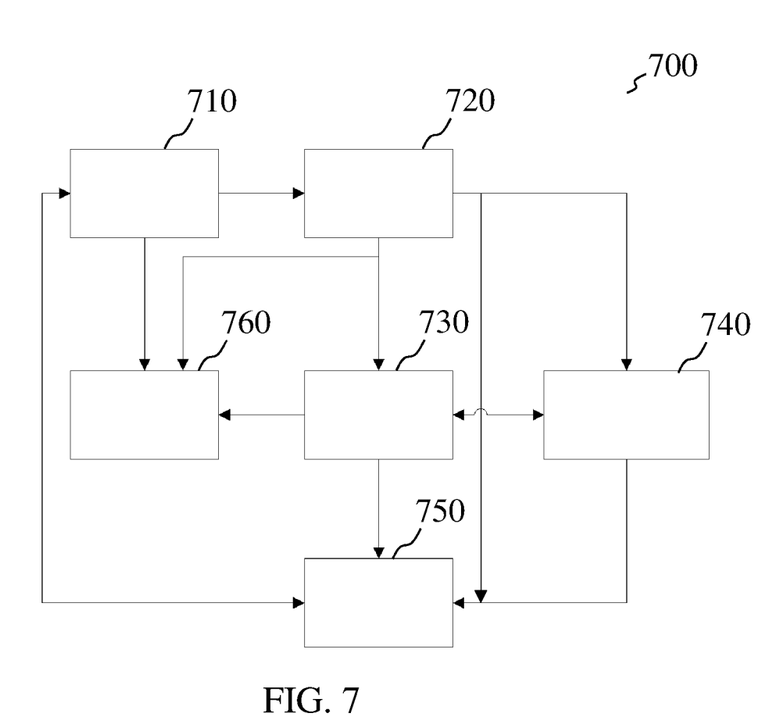
FIG. 7 shows an exemplary state switching block diagram for a method according to various embodiments.

FIG. 7 shows an exemplary state switching block diagram for a method according to various embodiments. The electric power system may be configured accordingly. The block diagram shows a power-on mode 710, a standby mode 720, a dual-battery power supply mode 730, a single-battery power supply mode 740, a charging mode 750, and a fault mode 760. Thus, the method and/or the electric power system according to various embodiments may be configured to be in one of these modes and switch to another of these modes according to pre-determined conditions. For example, the mode may be determined by the microprocessor MP1, for example, the microprocessor may provide the switching between modes.

According to various embodiments, the electric power system may be brought into the power-on mode 710 by inserting a battery unit, thus providing power, for example via a small power output of the battery unit. Alternatively, the electric power system may be brought into the powered-on mode by re-setting and/or starting the electric power system when the electric power system is connected to the charge adapter. In the power-on mode 710, the electric power system is powered on.

In some embodiments, the electric power system may try to detect the presence of the first and the second battery units. If no battery unit is detected, for example both of the first and second battery units are not detected, then the method may switch to the fault mode 760. If at least one battery unit is detected, for example at least one of the first and second battery units, then the method may switch to the standby mode 720.

According to various embodiments, after a swappable battery unit is connected to the electric power system, for example, the first battery unit or the second battery unit is connected to the electric power system, an internal battery management system may detect whether its voltage is within a nominal normal voltage range. If the voltage is within the nominal normal voltage range (for example above a nominal value, or within 10% of a nominal value), then the respective small current output may be turned on, thus, powering on the electric power system.

According to various embodiments, if it is detected that the temperature exceeds a pre-determined temperature threshold then the method is switched to the fault mode 760. According to various embodiments, the temperature threshold may be chosen from 85° C. to 125° C., for example it may be 90° C.

According to various embodiments, while in the power-on mode, if a power adapter is detected, the electric power system may enter charging mode (arrow not shown in FIG. 7). For example, the method may proceed as explained in connection with FIG. 3.

In the standby mode 720, the electric power system is powered on with stand-by power, which may be, for example, from a small current output(s) of the first and/or the second battery units. If a fault is detected in the standby mode 720, then the method may switch to the fault mode 760. For example, the method may include detecting the fault of the electric power system when at least one of the following is satisfied: a temperature of the electric power system is above a pre-determined temperature threshold; failing to detect both the charge state of the first battery unit and the charge state of the second battery unit; the communication between the power control circuit and both of the first and second battery units fails. If no fault is detected, once high power is requested, the method may switch to the dual-battery power supply mode 730 or to the single-battery supply mode 740, depending on the battery units availability and charge state, for example, as explained in accordance with various embodiments (e.g., in connection with FIG. 2).

In some embodiments, high power may be requested by a user, for example, the user may operate an accelerator, a switch, or a button. For example, the user may initiate a drive command in the case that the electric power system is of or for an electric vehicle, such as an electric scooter.

According to various embodiments, if the power control circuit does not detect any communication error with the first battery unit and the second battery unit, for example if communication between the power control circuit, e.g. the microprocessor, and each of the first and second battery units is successfully established, the method may switch to the dual-battery power supply mode 730. If the communication between the power control circuit, e.g., the microprocessor, and one of the first and second battery units fails, the high current output and/or the small current output of the battery unit is turned off. For example, the battery unit may detect a communication error and turn off the high current output and/or the small current output. If the communication with the other battery unit does not fail, then the high current output of this other battery unit is enabled (for example by sending a discharge enable command), and the method may switch to the single-battery power supply mode 740. In some embodiments, the communication error may be implemented via a battery communication timeout function, for example when the battery attempts communication with the electric power control circuit and no acknowledgment is received within a predetermined battery communication timeout period. If the communication with one of the battery units is abnormal, the power control circuit cannot obtain the battery voltage through the communication, and can therefore not determine whether there will be a huge charge difference with the other battery unit. If the one battery unit continues to supply power, there will be a risk, since a huge charge difference will cause damage to the two batteries. Therefore, it is advantageous that the high current output of each of the first and second battery units is turned off by the battery communication timeout function.

According to various embodiments, if no fault is detected and a power adapter is detected, the method may switch to the charging mode 750 (arrow is not shown in the FIG. 7).

According to various embodiments, the mode switching may depend on a lock status. The lock status may be: an electronic lock status, for example stored at the microprocessor; a mechanical lock status, for example of a vehicle physically locked (e.g. a scooter locked to a rack); or a combination of both. The lock status may indicate, e.g., a locked or an unlocked condition. In some embodiments a switch to the dual-battery power supply mode 730 or to the single-battery power supply mode 740, for example from the standby mode 730, may further require that the lock status indicates the locked condition.

In the dual-battery power supply mode 730 (also named as dual-battery discharge mode) both battery units are supplying high current, for example to drive a load, e.g., a motor of an electric vehicle. If a fault is detected in the dual-battery power supply mode 730 (for example when all battery units are disconnected), then the method may switch to the fault mode 760. For example, the method may include detecting the fault when at least one of the following is satisfied: a temperature of the electric power system is above a pre-determined temperature threshold; failing to detect both the charge state of the first battery unit and the charge state of the second battery unit; the communication between the power control circuit, and both of the first and second battery units fails; the voltage of the battery differs by more than 2500 millivolts, for example by more than 3000 millivolts. If no fault is detected and a power adapter is detected, the method may switch to the charging mode 750. If the difference between the charge state of the first battery unit and the charge state of the second battery unit is too high, for example higher than the first pre-determined charge difference $\Delta 1$ (e.g., as explained in connection with FIG. 2), then the method may switch to the single-battery power supply mode 740. Still in the dual-battery power supply mode 730, in the case that the communication between the communication between the power control circuit, e.g., the microprocessor, and one of the first and second battery units fails, the method may switch to the single-battery power supply mode 740, further, the discharging of the offending battery unit (with failed communication) may be disabled, for example, the high current output of the offending battery unit may be turned off. According to various embodiments, the offending battery unit may detect a communication error and turn off its high current output, and may further turn off its small current output.

According to various embodiments, if the system is locked while in the dual-battery power supply mode 730 or the single-battery power supply mode 740, the method may switch to the standby mode 720. The system may be locked by locking an electric vehicle including the system, for example locking a scooter including the system. Locking of the system may refer to locking of the electric vehicle.

According to various embodiments, if a power adapter is detected, for example while in one of the dual-battery power supply mode 730, the single-battery power supply mode 740, or the standby mode 720, the method may switch to the charging mode 750.

In the single-battery power supply mode 740 (also named as single-battery discharge mode), the discharging is enabled in one of the first and second battery units and disabled in the other one of the first and second battery units. Discharging may be enabled, e.g., by having the respective high current output on. Discharging may be disabled, e.g., by having the respective high current output off. In addition, the discharging disable may also include the low-current output off. The battery unit having the discharging enabled may also be called the powered battery unit, and the battery unit having its discharging disabled may also be called the unpowered battery unit. In the single-battery power supply mode 740, in the case in which the powered battery unit is the battery unit with the higher charge state among the first battery unit and the second battery unit, and the difference between the charge state of the powered battery unit and the charge state of the unpowered battery unit is lower than a pre-determined charge difference, e.g., lower than the first pre-determined charge difference $\Delta 1$ (such as explained in connection with FIG. 2), then the method may switch to the dual-battery power supply mode 730. Further in the single-battery power supply mode 740, if the powered battery unit is the battery unit with the lower charge state among the first battery and second battery units, the electric power system may continue to be powered by the powered battery unit and may not be switched to the dual-battery power supply mode 730, unless the method otherwise exits the single-battery power supply mode 740, e.g., via locking the electric power system and thereby returning to the standby mode. As previously explained, the voltages of the battery units may be used to represent the respective charge states.

According to various embodiments, in the single-battery power supply mode 740, if the communication between the power control circuit, e.g., the microprocessor, and the unpowered battery unit fails (and communication with the powered battery unit remains), the method remains in the single-battery power supply mode 740.

According to various embodiments, in the single-battery power supply mode 740, if the communication between the power control circuit, e.g., the microprocessor, and the powered battery unit fails, the respective battery unit may automatically turn off the high current output and/or the small current output, thus the electric power system loses power. Each of the first and the second battery units may be configured to turn itself off when it fails, e.g., when the respective battery unit detects a failure, the turning off may refer to turning off the high power output and/or the small current output. In some embodiments, this may be independent of communication with the unpowered battery unit.

According to various embodiments, if the communication between the power control circuit, e.g., the microprocessor, and both of the first and second battery unit fails, the respective battery unit may automatically turn off the high current output and/or the small current output, thus the electric power system loses power. Each of the first and the second battery units may be configured to turn itself off when a communication error occurs, e.g., when the respective battery unit detects a communication error, the turning off may refer to turning off the high power output and/or the small current output.

Once in the charging mode 750, the method may continue in the charging mode. In some embodiments, each of the first and second battery units have an internal charge regulator which stops charging internally if the charge is at or above nominal full charge. Alternatively or in addition, the power control circuit itself may control the charging state of the each of the first and second battery units. The method may stay in the charging mode until the power adapter is unplugged and/or the electric power system is restarted (for example by a user command, e.g., a user activating a switch), upon which the method returns to the power-on mode 710.

According to various embodiments, in the fault mode 760 each of the first and second battery units have discharging disabled, for example, the high-current output of each of the first and the second battery units is off. The high-current output of each of the first and the second battery units may be turned off when entering the fault mode 760, for example at another mode before entering the fault mode 760 and/or at the fault mode 760 after entering fault mode 760. For example, if the electric power system is of a vehicle, such as an electric scooter, the vehicle is powered off when in fault mode, thus the battery units are not allow to power any motor. According to various embodiments, in the fault mode, charging is disabled. According to some embodiments, in the fault mode, the small current output may be kept on.

According to various embodiments, the electric power system may be configured to power an electric vehicle, for example including an electric motor. An aspect of the disclosure also relates to an electric vehicle including an electric power system as described in accordance with various embodiments. According to various embodiments, the electric vehicle may include, but not limited to, electric scooter, powered scooter, electric kick scooter, or powered kick scooter. According to various embodiments, the electric vehicle may be configured as a vehicle that is to be used by a user, has two or more wheels, is propelled or can be selectively propelled by an electric motor attached to the vehicle. According to various embodiments, the electric vehicle may be configured as a form of personal transportation for movement of user from one location to another location. According to various embodiments, the electric vehicle may include respective supports, e.g. receptacles, for the first and the second battery units.

According to various embodiments, the electric vehicle may be configured with ease of operations. According to various embodiments, one of the factors affecting the success of the battery unit swapping feature is how long it takes for operations team to swap the battery unit in the field. Currently, vehicles with removable battery units are available. However, there is a huge difference between swappable battery unit and removable battery unit. Removable battery unit means the battery unit pack can be removed in specific conditions with certain efforts. Swappable, however, means that an operation worker may go into the field and easily take the battery units out of a secure and locked chamber and swap in another charged battery unit pack, all in a limited timeline when their truck is waiting by the road. For example, a battery unit swapping time may be between 2-3 minutes. A highly trained operator may be able to carry out the swapping of both the first and second battery units within 20 to 30 seconds. According to various embodiment, being swappable means 'quick change' or 'quick replace', without requiring cable disconnecting, without requiring of folding/unfolding of main body, without requiring taking out screws or nuts, without requiring lifting up or side tilting of scooter body, without requiring electric operation using electric power. According to various embodiments, the electric vehicle may be configured for quick and easy on-site swapping of battery unit/battery units.

Various embodiments also relate to a computer executable code, or a computer program product, including instructions for carrying out the method described herein.

Various embodiments also relate to a computer executable code or a computer program product, including instructions for operating an electric power system according to the method described herein.

The computer program product may include one or more of a microprocessor, a volatile memory, a non-volatile memory, communication interfaces, I/O pins, analog input pins, analog output pins, a combination thereof.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of operating an electric power system comprising:
   determining a charge state of a first battery unit and a charge state of a second battery unit;

determining a difference between the charge state of the first battery unit and the charge state of the second battery unit;

determining whether to enable discharging simultaneously of both the first battery unit and the second battery unit, or to enable discharging of one of the first battery unit and the second battery unit, based on the difference between the charge state of the first battery unit and the charge state of the second battery unit;

detecting if there is a fault of the electric power system, comprising:
- detecting if a temperature of the electric power system is within a pre-determined temperature threshold,
- detecting the charge state of the first battery unit and the charge state of the second battery unit, if the temperature of the electric power system is within the pre-determined temperature threshold, and
- detecting the fault of the electric power system, if the temperature of the electric power system is above the pre-determined temperature threshold or both the charge state of the first battery unit and the charge state of the second battery unit are not detected within a timeout period;

repeating the detecting if there is the fault of the electric power system, if at least one of the charge state of the first battery unit and the charge state of the second battery unit is detected; and disabling discharging on both the first battery unit and the second battery unit if the fault of the electric power system is detected;

wherein at least one of the first battery unit and the second battery unit is a swappable battery unit.

2. The method of claim 1, further comprising:
determining the difference comprises determining a lower charge state and a higher charge state among the first battery unit and the second battery unit.

3. The method of claim 2, further comprising:
comparing the difference between the higher charge state and the lower charge state with a first pre-determined charge difference to obtain a first comparison result; and determining whether to enable discharging simultaneously of both the first battery unit and the second battery unit, or to enable discharging of one of the first battery unit and the second battery unit, based on the first comparison result.

4. The method of claim 3, further comprising:
enabling discharging simultaneously of both the first battery unit and the second battery unit when the first comparison result indicates that the difference between the higher charge state and the lower charge state is lower than the first pre-determined charge difference.

5. The method of claim 3, further comprising:
enabling discharging of one of the battery unit of the first battery unit and the second battery unit with the higher charge state, and disabling discharging of the battery unit of the first battery unit and the second battery unit with the lower charge state when the first comparison result indicates that the difference between the higher charge state and the lower charge state is higher than or equal to the first pre-determined charge difference.

6. The method of claim 2, further comprising:
comparing the difference between the higher charge state and the lower charge state with a second pre-determined charge difference to obtain a second comparison result; and determining whether to enable charging of both the first battery unit and the second battery unit, or enable charging of one of the first battery unit and the second battery unit, based on the second comparison result.

7. The method of claim 6, further comprising:
enabling charging of both the first battery unit and the second battery unit when the second comparison result indicates that the difference between the higher charge state and the lower charge state among the first battery unit and the second battery unit is lower than the second pre-determined charge difference.

8. The method of claim 6, further comprising:
enabling charging of the battery unit of the first battery unit and the second battery unit with the lower charge state, and disabling charging of the battery unit of the first battery unit and the second battery unit with the higher charge state when the second comparison result indicating that the difference between the higher charge state and the lower charge state among the first battery unit and the second battery unit is higher or equal than the second pre-determined charge difference.

9. The method of claim 1, further comprising:
disabling charging of both the first battery unit and the second battery unit when the fault of the electric power system is detected.

10. The method of claim 1, wherein the charge state is determined by measuring voltage of a battery unit.

11. The method of claim 1,
wherein enabling discharging comprises sending a discharge enable command from a power control circuit of the electric power system to the respective battery unit; and wherein disabling discharging comprises sending a discharge disable command from the power control circuit to the respective battery unit.

12. The method of claim 1,
wherein enabling charging comprises sending a charge enable command from a power control circuit of the electric power system to of the respective battery unit; and wherein disabling charging comprises sending a charge disable command from the power control circuit to the respective battery unit.

13. The method of claim 1, wherein each of the first battery unit and the second battery unit is the swappable battery unit.

14. An electric power system comprising:
a first electrical connection for connecting with a first battery unit;
a second electrical connection for connecting with a second battery unit;
a power control circuit comprising a microprocessor in communication with the first battery unit and the second battery unit when these are connected, the microprocessor configured to:
determine a charge state of the first battery unit and a charge state of the second battery unit;
determine a difference between the charge state of the first battery unit and the charge state of the second battery unit;
determine whether to enable discharging simultaneously of both the first battery unit and the second battery unit, or to enable discharging of one of the first battery unit and the second battery unit, based on the difference between the charge state of the first battery unit and the charge state of the second battery unit;

detect if there is a fault of the electric power system,
wherein, to detect if there is the fault of the electric power system, the microprocessor is configured to:
  detect if a temperature of the electric power system is within a pre-determined temperature threshold,
  detect the charge state of the first battery unit and the charge state of the second battery unit, if the temperature of the electric power system is within the pre-determined temperature threshold, and
  detect the fault of the electric power system, if the temperature of the electric power system is above the pre-determined temperature threshold or both the charge state of the first battery unit and the charge state of the second battery unit are not detected within a timeout period;
repeat the detecting if there is the fault of the electric power system, if at least one of the charge state of the first battery unit and the charge state of the second battery unit is detected; and
disable discharging on both the first battery unit and the second battery unit if the fault of the electric power system is detected,
wherein at least one of the first battery unit and the second battery unit is a swappable battery unit.

15. The electric power system of claim 14, wherein each of the first battery unit and the second battery unit is the swappable battery unit.

16. The electric power system of claim 14, wherein the charge state is determined by measuring voltage of a battery unit.

17. The electric power system of claim 14, wherein enabling discharging comprises sending a discharge enable command from a power control circuit of the electric power system to one of the first battery unit and the second battery unit; and
  wherein disabling discharging comprises sending a discharge disable command from the power control circuit to one of the first battery unit and the second battery unit.

18. The electric power system of claim 14, wherein enabling charging comprises sending a charge enable command from a power control circuit of the electric power system to one of the first battery unit and the second battery unit; and
  wherein disabling charging comprises sending a charge disable command from the power control circuit to one of the first battery unit and the second battery unit.

19. The electric power system of claim 14, further comprising the first and the second battery units.

20. The electric power system of claim 19, wherein each of the first and second battery units is configured to detect a communication error, and to turn off a respective output when the communication error is detected.

* * * * *